Figure 4:
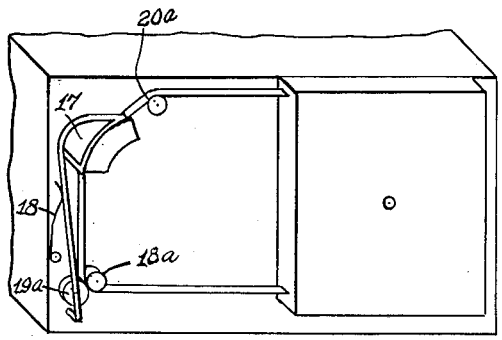

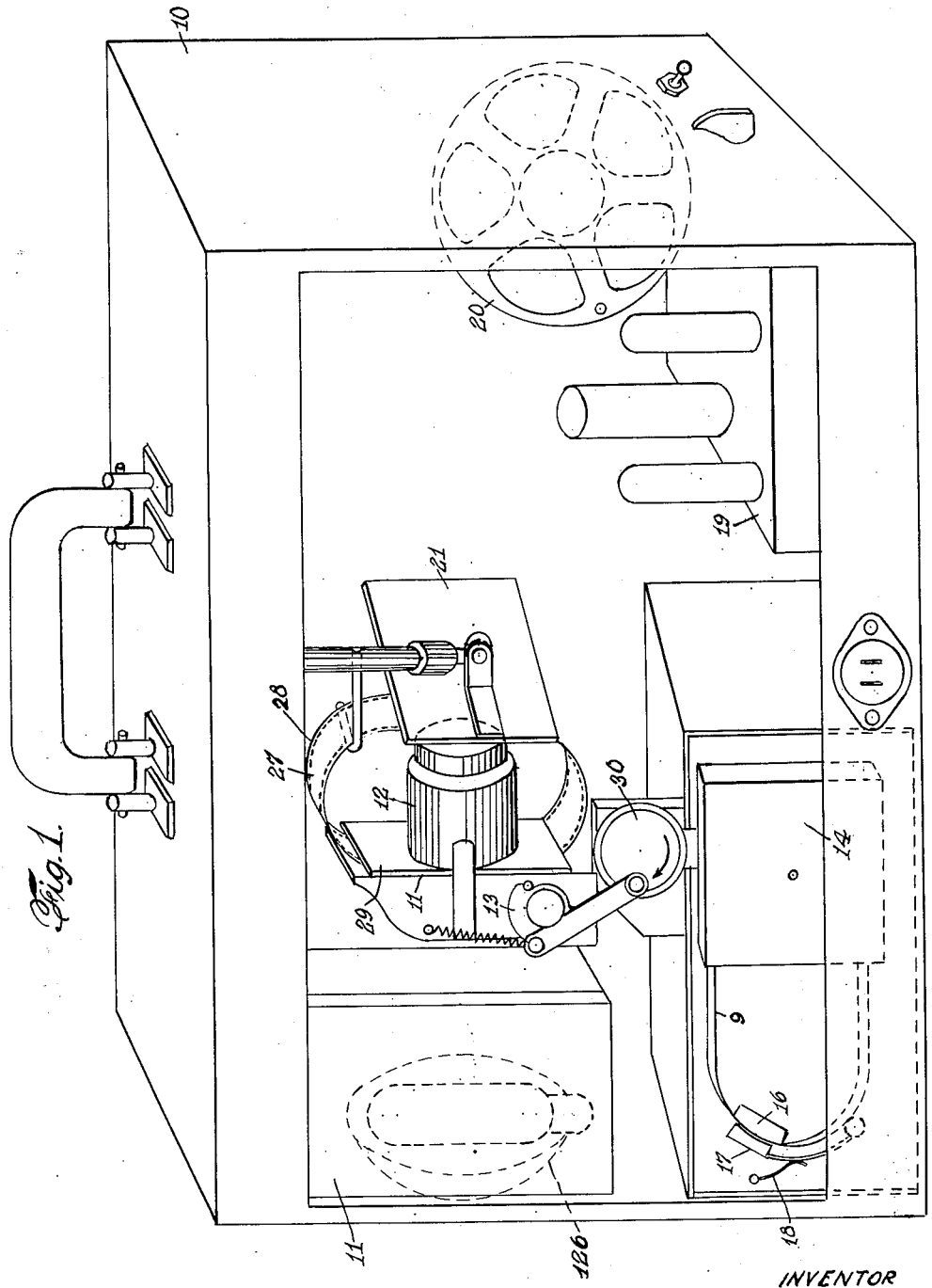

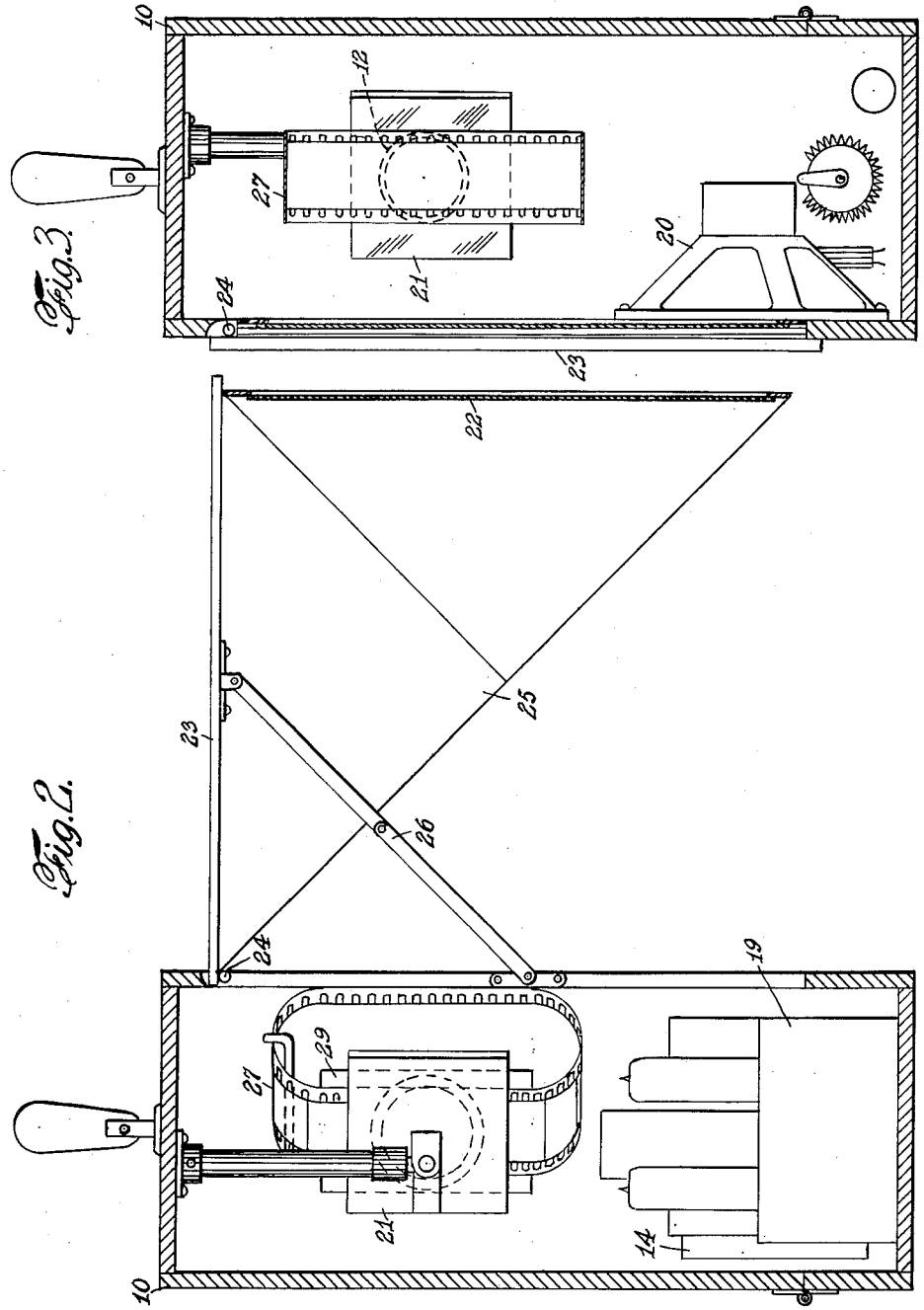

INVENTOR.
ROGER WADE
BY
ATTORNEY

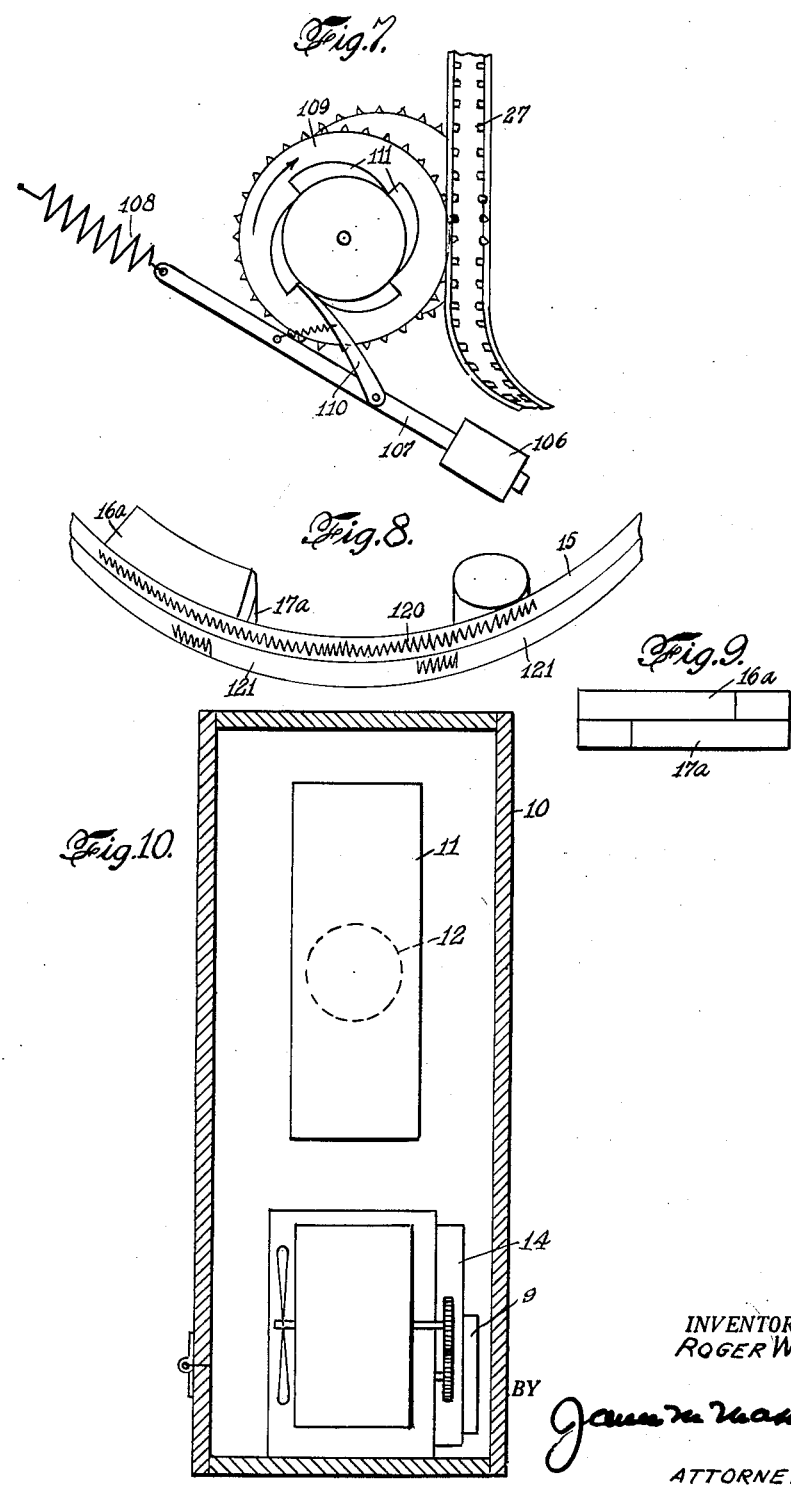

United States Patent Office 3,028,789
Patented Apr. 10, 1962

3,028,789
VIEWER FOR SALES PROMOTION AND SIMILAR PURPOSES
Roger Wade, 35 Mitchell Road, Port Washington, N.Y.
Continuation of application Ser. No. 472,321, Dec. 1, 1954. This application Apr. 19, 1960, Ser. No. 23,339
5 Claims. (Cl. 88—28)

This invention relates to a novel sound and viewing device designed to function automatically for the presentation of recorded material, and the instant application is a continuation of application Serial No. 472,321 filed December 1, 1954, now abandoned.

It contemplates the integration of sound and picture projecting means in a light-weight portable unit and the synchronization of the several elements involved in such a manner that sales promotion and technical material can be presented to prospective buyers in an accurate and expeditious manner. More particularly, the invention provides a simple arrangement and novel combination of the audio and visual components in such a way that illuminated pictures and accompanying predetermined sound effects may be produced within a self-contained enclosure which may be transported about in the same manner as a brief case. The device is particularly adapted for use by salesmen and other individuals where territorial coverage is an important factor.

Heretofore various devices have been attempted in the sales presentation of recorded material. These devices usually included bulky projectors, screens, and the like, and sound effects, where provided, were either presented verbally by the salesmen or by means of relatively heavy recorded sound track systems. The weight factor involved in such equipment discouraged its use with small groups and severely restricted territorial coverage. The necessity of assembly and disassembly of the equipment rendered it impossible for a salesman to maintain more than several interviews during a single day for example, and limited the use of the equipment in audio-visual applications to relatively large audiences.

The primary object of the present invention is to render available the benefits of audio-visual methods in more compact and variable application by making it practical for salesmen to use the device in daily activities and contacts. The device of the present invention can be employed for efficient synchronized sound and visual presentations to groups of from one to six viewers. The present device contemplates the inclusion in a single compact enclosure of a translucent screen, a stepwise continuous film projector for transferring images from the film onto the screen, a tape playback sound unit, and means for automatically advancing the filmstrip in stepwise fashion at predetermined points on the sound recorder tape. The invention moreover provides for a novel combination of elements in a small compact unit whereby predetermined recorded material is presented and repeated automatically by merely switching the mechanism into operation as desired or needed.

Figure 5:
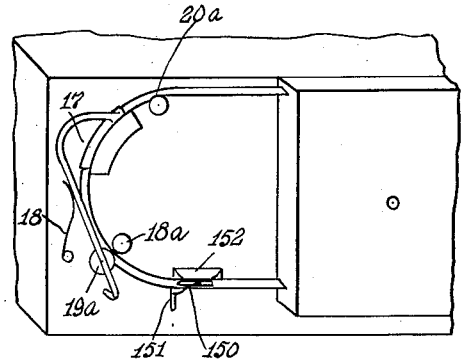
Figure 6:
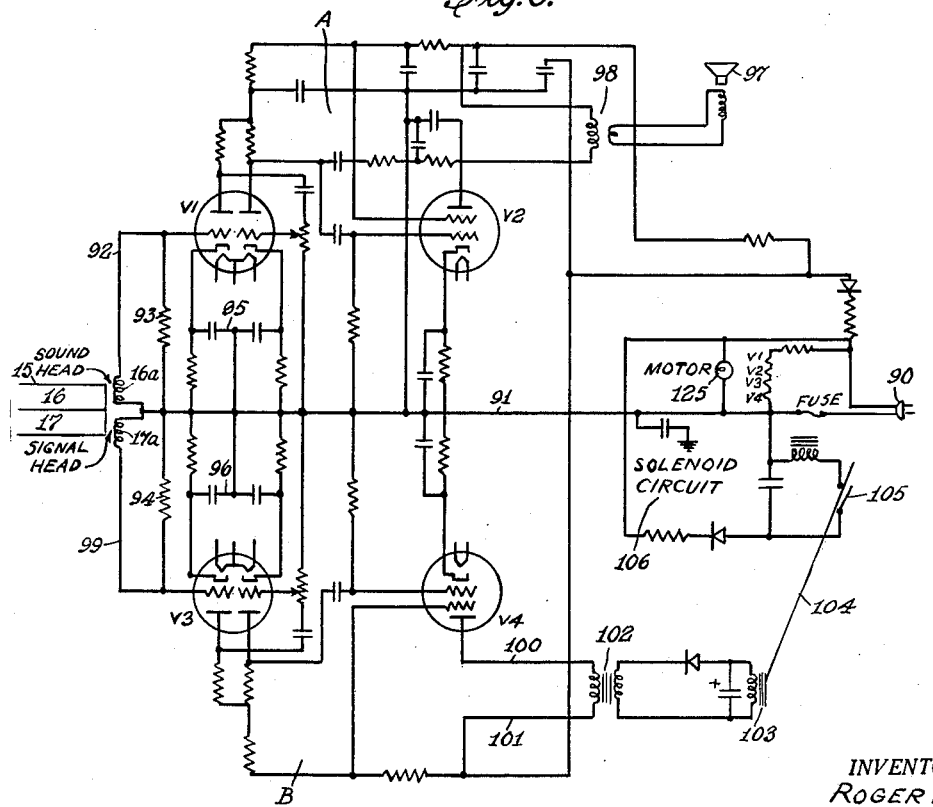

Referring to the drawings particular embodiments of the invention are shown for purposes of illustration. FIGURE 1 illustrates the self contained unit in the form of a portable case with the hinged rear door removed to reveal the arrangement of the internal components of the unit. FIGURE 2 is a sectional elevation on one end of the enclosure. FIGURE 3 is a sectional elevation on the other end of the enclosure. FIGURE 4 is a fragmentary view showing one form of tape playback section. FIGURE 5 is a similar view of a modified form of tape playback section. FIGURE 6 is a wiring diagram of the amplifier system. FIGURE 7 is a diagrammatic representation of the solenoid film advancing mechanism. FIGURE 8 is a diagrammatic representation of the relation of the twin-track recording tape to the sound head and signal head elements. FIGURE 9 is the two faced recording head, and FIGURE 10 is an end view, in section, illustrating the combination fan and capstan drive.

The present invention provides a combination of elements which results in a new portable light-weight device having separate viewing and audio components, synchronized for use in conveying information to others. The device is designed so that it can be carried directly to the point where the information is to be given, and appears as a light-weight carrying case 10 while being transported. The invention of this application is directed to a self-contained projector viewer and sound reproducing apparatus. All the ingredients necessary for the transmission of sales data and other information are provided for in a compact, light weight, easy to operate device which is not much larger than the normal brief case.

Referring in detail to the drawings it will be observed that FIGURE 1 shows a portable reduced size box carrying case 10 having a handle, and top, bottom, front, rear and side walls; and contained therein is a loop film strip projector 11, lens 12 and sprocket mechanism 13.

Mounted on the top of the case 10 at an angle of approximately 45° is an adjustable mirror 21, and in one side of the case is also mounted a collapsible translucent screen 22. FIGURE 2 illustrates the screen 22 in operative position, and the rear hinged door which provides access to the interior of case 10, closed. It will be observed that the screen 22 is mounted in a section 23 at one side of the case. The section 23 is pivoted at 24 and supports the screen 22. Light-shielding baffles 25 are disposed at the ends of the screen 22 and the screen is supported in viewing position by foldable brackets 26. FIGURE 3 illustrates the screen 22 in collapsed position wherein it will be observed that it forms a side of the carrying case 10.

In the present invention, film strip 27 and projector 11 are used to display visual information on translucent screen 22 which is foldably fastened to side 23 of the carrying case 10. In this connection, the film strip projector 11 includes an endless or continuous film strip 27 suitably guided, and having a series of frames 28 adapted to be advanced stepwise through the gate 29 of the film strip projector as shown in FIGURE 1. The film advancing mechanism includes a solenoid 30 shown generally in FIGURE 1 and illustrated more specifically in FIGURES 6 and 7 to be described hereinafter.

A separate audio system utilizing tape 9 and tape playback mechanism 14 supplies descriptive information for the viewer as well as synchronizing information for the projector. Information on tape 9 determines the instant at which film strip 27 is advanced a frame. Accordingly, the playback section 14 advances a two-section sound track 9 over the double recording head 16. Integrally mounted on the film strip projector is a tape playback track cartridge mechanism 14 and an endless or continuous track tape 9. The endless track tape 9 passes over a multiple recording head 16 having sound head and signal head sections 16a and 17a as shown in FIGURES 6, 8, and 9 respectively. The two-section track 9 is held in close engagement with the two-faced recording head 16 by means of a compression device 17 which includes a spring 18. The endless tape 9, under ordinary circumstances, is continuously driven by capstan 18a, with idler pulleys 19a cooperating therewith.

The tape playback section 14 is connected with a chassis mounted amplifier 19 which in turn is connected with a speaker 20.

Thus, the invention provides in one carrying case 10 the elements required for audio-visual presentation of information. A translucent screen 22 is provided, which is an integral part of the case 10 itself and a film strip projector 11 is mounted within the case in such a manner that an image may be directed to the screen 22 for viewing by a group of persons. Further, a sound reproducing and amplifying apparatus A is mounted within the case 10 for the transmission of data related to that which is presented by the visual means. Acting between the visual and sound producing elements 27 is a mechanism B, which synchronizes the movement of the film strip 27 through the projector 11 with the sound or record tape 9. In this manner, the data which is being presented on the screen 22 is kept in direct relation to the data which is being presented by the audio means A.

Referring to the wiring diagram in FIGURE 6, it will be observed that a plug 90 is adapted for connection with a 110 volt current source, and in turn is connected in parallel with the signal and sound heads through line 91. The sound head amplifying mechanism A is shown disposed above the line 91, and the signal head amplifying mechanism B is shown below the line 91. It will be observed that recorded material received on the sound head 16a is amplified by means of tubes $V_1$ and $V_2$ and is connected with tube $V_1$ through line 92. The system includes resistors 93 and 94, and condensers 95 and 96 which perform the usual function in a capacitance coupled amplifier. The tubes $V_1$ and $V_2$ are in turn connected to a speaker 97 through an output transformer 98.

On the other hand, the signal head amplifying system includes a line 99 which is connected with amplifier tubes $V_3$ and $V_4$ for the signal amplifying mechanism. The amplifier tubes $V_3$ and $V_4$ are connected in turn through lines 100, 101, and output transformer 102 with a relay 103. The relay 103 is shown to be connected at 104 for closing the switch 105 to the solenoid circuit 106 when a signal is received on the signal head 17a.

Referring to FIGURE 7 it will be observed that when energized, the solenoid 106 actuates a lever 107 having at the opposite end a spring 108. As shown in FIGURE 7, the film advancing mechanism including sprocket 109 is adapted to be advanced in a stepwise fashion by means of an arm 110 mounted on the lever 107. Sprocket 109 has a series of cams 111 which are engaged by a spring pressed dog 110 as the solenoid is energized.

When the solenoid 106 is energized, the lever 107 is moved to the right against the tension of the spring 108, and on de-energization, the spring 108 moves the lever 107 to the left while the arm 110 engages one of the cams 111 to move the sprocket a quarter of a turn. This movement of the sprocket 109 moves the endless film 27 to position the succeeding frame in front of the lens 12.

Referring to FIGURE 8 it will be seen that recorded material such as a sales presentation relating to the subject of a particular frame is recorded on the sound track portion 15 of the endless track 9. At predetermined portions of the script, when it is desired to shift the film to project a new frame on the translucent screen 22, a signal 121 is recorded on the signal track section 17. Accordingly, the film is advanced when the signal 121 passes over the signal head 17a and is amplified in tubes $V_3$ and $V_4$ to actuate lever 104, thereby closing the switch 105 in the solenoid circuit 106. This energizes the solenoid 106 moving the lever 107 to the right and after the signal has passed over the signal head 17a, the solenoid is de-energized on opening of the switch 105 releasing the arm 107, thereby turning the sprocket 109 to the action of spring 108.

A motor 125 is connected with capstan 18a for continuous movement of the record tape 9 and also to the fan 126.

Referring to FIGURE 5, a modified form of signal take off and switching means is illustrated. In place of the periodic recording on the signal track section described in the principal embodiment, the sound tape is provided with elongated slots 150 traveling over an electrode 152 which is in turn connected with the solenoid circuit. A spring contact 151 bears on the top of the tape as the recordings are picked up and amplified by the sound head. The slots are positioned at those locations of the sound track where a shift in the endless film is desired to occur and as the slots come over the electrode 152 contact is made therewith by spring contact 151, thereby closing the solenoid circuit, and actuating the solenoid to present a new frame in the continuous film strip projector.

As will be appreciated by those skilled in the art, an embodiment of the device of the present invention may employ a 35 mm. endless film strip loop, and a self rewinding tape cartridge loaded with recording tape which may be a one quarter inch plastic recording tape, for example. The device is so arranged, that it provides a packaged audio-visual presentation which operates continuously on house current, can be discontinued at any point, and will continue to operate without interruption when the current is renewed. The device requires no rewinding or rethreading and portions can be changed quickly and without effort on the part of the operator.

It will be understood that these and many other modifications and variations may be made in the details of the embodiments illustrated herein without departing from the invention.

I claim:

1. Audio-visual apparatus of relatively light weight comprising in combination: a portable reduced size case having a handle and including top, bottom, front, rear and side walls, a section of the front wall being pivotally connected to the case and adapted to be swung outwardly about the pivotal connection to a generally unfolded predetermined position, a translucent screen secured to said section and positioned within the case, said screen being adapted, upon disposition of said section in said predetermined position, to be supported in a substantially viewable position from the end of said section directed away from said pivotal connection, means for holding said section in said predetermined position and said screen in said viewable position, one of the other of said walls being selectively shiftable for providing access to the interior of said case; a continuous loop film strip projector disposed within the case and supported by one of said walls, said projector being directed towards one of said walls, a continuous loop film strip being removably mounted in said case, guide means for operatively connecting said continuous film strip to said projector, a mirror mounted within said case between said projector and one of said walls to direct an image from said projector to said transluscent screen, film advancing means operatively connected to said projector for advancing said film strip a single frame at a time therethrough, electrical means for activating said film advancing means, said film advancing means comprising a sprocket hole engaging means for engaging the sprocket receiving openings in said film strip, means coupling said electrical means and said sprocket hole engaging means for actuating said sprocket hole engaging means to advance said film strip to its next frame upon energization of said electrical means; a tape playback unit including a record tape cartridge having a continuous record tape having a predetermined signal thereon, chassis means for supporting said cartridge within said case; means for continuously driving said tape, signal pick-up means mounted in operative connection with said tape for receiving and transmitting signals on said tape, and control means providing electrical connection between said pick-up means and said electrical means for energizing said electrical means to activate said film advancing means to advance said film strip to its next frame in synchronization with the program on said tape, a speaker being mounted on one of the said walls within said case, second control means providing electrical connection between said pick-up means and said speaker for transmitting electrical audio signals from said pick-up means to said speaker, both of said control means including electrical circuitry, an electrical chassis being mounted on one of said walls within said case, and said circuitry being coupled to said chassis and being disposed within said case.

2. The invention in accordance with claim 1 wherein a pair of side flaps are connected adjacent opposite side edges of said screen, said flaps being adapted upon disposition of said section in said predetermined position and said screen in said viewable position to assume a position substantially normal to said screen and said section, and said flaps functioning to shield light when in said position substantially normal to said screen and said section.

3. An audio-visual apparatus as in claim 1, wherein said control means between said pick-up means and electrical means comprise a signal on said record tape and a signal detecting switch connected to said electrical means whereby said electrical means is energized on the passage of said signal past said signal detecting switch.

4. An audio-visual apparatus as in claim 1, wherein said control means between said pick-up means and said electrical means comprises an electrode adjacent one side of said record tape, a slot in said record tape and a contact adjacent the opposite side of said record tape, whereby—on the passage of said slot between said electrode and contact—said electrical means is energized such that said film strip is advanced in a step-wise fashion.

5. The invention in accordance with claim 1 wherein said sprocket hole engaging means include a sprocket wheel and said means coupling said electrical means and said sprocket hole engaging means includes a dog means, and said electrical means includes a solenoid, and said dog means being adapted to rotate said sprocket wheel to advance said film strip to its next frame upon energization of said solenoid.

References Cited in the file of this patent
UNITED STATES PATENTS

| | | |
|---|---|---|
| 2,575,579 | Bullock et al. | Nov. 20, 1951 |
| 2,631,855 | Kornei | Mar. 17, 1953 |
| 2,693,127 | Ortman | Nov. 2, 1954 |
| 2,699,089 | Jakobs et al. | Jan. 11, 1955 |